(12) United States Patent
Wang

(10) Patent No.: US 6,799,810 B1
(45) Date of Patent: Oct. 5, 2004

(54) DOUBLE-DECK WHEEL RIM COVER

(76) Inventor: Chu-Li Wang, No. 295, Lane 168, Sec. 1, Chang Hsi Road, Tainan (TW)

( * ) Notice: Subject to any disclaimer, the term of this patent is extended or adjusted under 35 U.S.C. 154(b) by 0 days.

(21) Appl. No.: 10/404,132

(22) Filed: Apr. 2, 2003

(51) Int. Cl.$^7$ ................................................. B60B 7/20
(52) U.S. Cl. .................................. 301/37.25; 301/37.33
(58) Field of Search ......................... 301/37.101, 37.25, 301/37.33, 37.29, 37.38, 37.108, 37.109

(56) References Cited

U.S. PATENT DOCUMENTS

| | | | | |
|---|---|---|---|---|
| 2,997,344 A | * | 8/1961 | Whiteman | 301/37.25 |
| 3,367,722 A | * | 2/1968 | Miyanaga | 301/108.1 |
| 6,048,036 A | * | 4/2000 | Alaoui | 301/37.376 |
| 6,517,167 B2 | * | 2/2003 | Baker | 301/37.25 |

* cited by examiner

Primary Examiner—Russell D. Stormer
(74) Attorney, Agent, or Firm—Bacon & Thomas, PLLC

(57) ABSTRACT

A double-deck wheel rim cover includes a wheel rim cover body formed integral with a plurality of support studs in the center portion of the inner side, with each support stud having a combining hole. A combining plate is fixed on the support studs, having a hollow combining shaft provided vertically in the center and having a combining hole. An inner decorative member is provided with a bearing in the center for receiving the combining shaft of the combining plate. The wheel rim cover body is further bored with plural windows to let the motion of the inner decorative member be seen therethrough. The inner decorative member is also provided with a weight-balancing member. When the automobile runs, there will produce a visual effect of different rotating speed of both the wheel rim cover body and the inner decorative member, acquiring functions of displaying both static and dynamic decoration.

4 Claims, 5 Drawing Sheets

DOUBLE-DECK WHEEL RIM COVER

BACKGROUND OF THE INVENTION

1. Field of the Invention

This invention relates to a double-deck wheel rim cover, particularly to one having functions of displaying both dynamic and static decoration of the wheel rim of an automobile.

2. Description of the Prior Art

A conventional wheel rim cover of an automobile, as shown in FIG. 1, includes a wheel rim cover body 1 having a plurality of insert bases 10 provided spaced apart equidistantly around the inner circumference and a steel ring 2 positioned at the inner side of the annular space formed by the insert bases 10. Then, the wheel rim cover is positioned on a wheel rim for decorating the wheel rim of an automobile.

Evidently, the conventional wheel rim cover merely has a function of static decoration in appearance, unable to display another decorative function when the automobile is running with the wheel rim cover synchronously rotating together with the wheel rim.

SUMMARY OF THE INVENTION

The objective of the invent ion is to offer a double-deck wheel rim cover, having functions of displaying both static and dynamic decoration.

A double-deck wheel rim cover in the present invention includes a wheel rim cover body provided with an inner decorative member in the center of the inner side facing the wheel rim, a combining plate provided to axially combine the inner decorative member with a plurality of support studs formed integral in the center. The combining plate is provided in the center with a hollow combining shaft extending outward vertically and having an insert hole, and the inner decorative member is fixed in the center with a bearing for the combining shaft of the combining plate to be fitted and positioned therein by a bolt engaging with the insert hole of the combining shaft. Besides, the inner decorative member is provided thereon with a weight-balancing member, and the wheel rim cover body is equidistantly bored with a plurality of windows to let the inner decorative member be seen through these windows from outside.

Thus, after installed on the wheel rim of an automobile, the wheel rim cover has effect of presenting its static decoration. And since the inner decorative member of the wheel rim cover is provided with a weight-balancing block, and is axially assembled on the wheel rim cover, it will not synchronously rotate together with the wheel rim cover at high speed, able to produce a visual effect of different rotating speeds of both the wheel rim cover body and the inner decorative member, accordingly obtaining effect of dynamic decoration.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
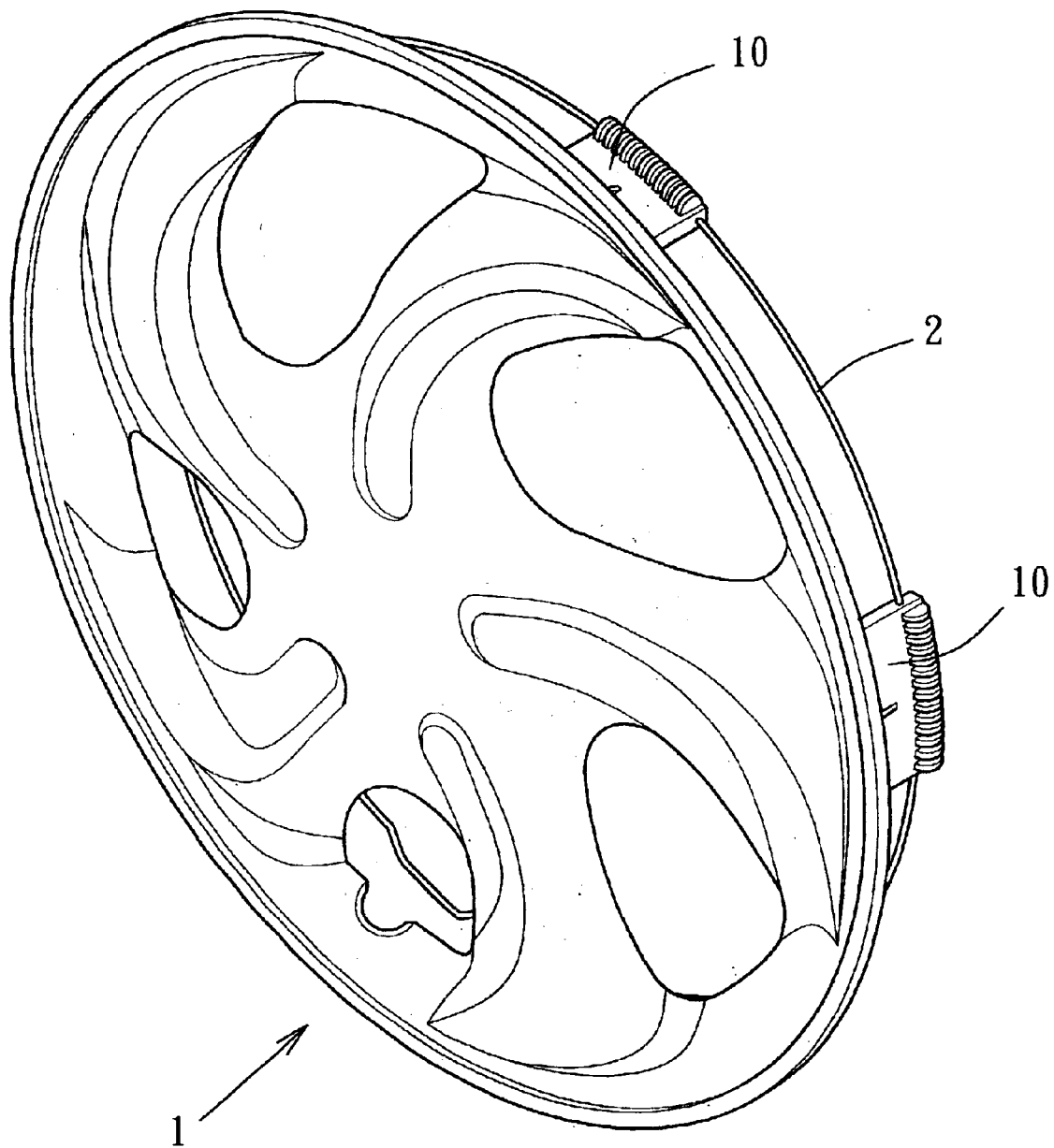
FIG. 1 is a perspective view of a conventional automobile wheel rim cover.
Figure 2:
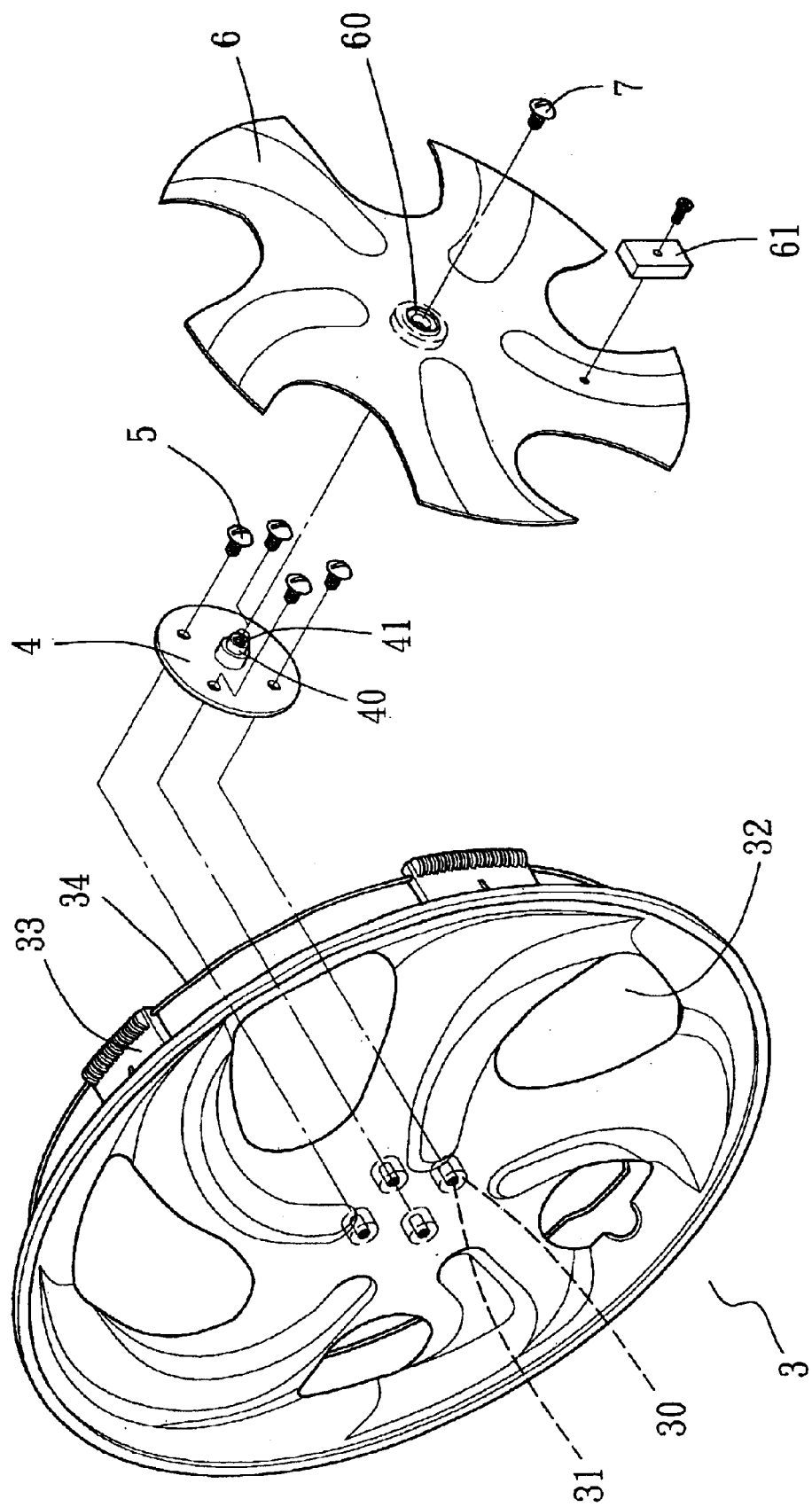
FIG. 2 is an exploded perspective view of a first embodiment of a double-deck wheel rim cover for an automobile in the present invention.

A first preferred embodiment of a double-deck wheel rim cover in the present invention, as shown in FIG. 2, includes a wheel rim cover body 3, a round combining plate 4 and an inner decorative member 6 as main components combined together.

The wheel rim cover body 3 is equidistantly provided with a plurality of insert bases 33 and a steel rim 34 around the inner circumference. The wheel rim cover body 3 has a plurality of support studs 30 formed integral in the center portion of the inner side to face the wheel rim and respectively having a combining hole 31 in the upper end.

Figure 3:
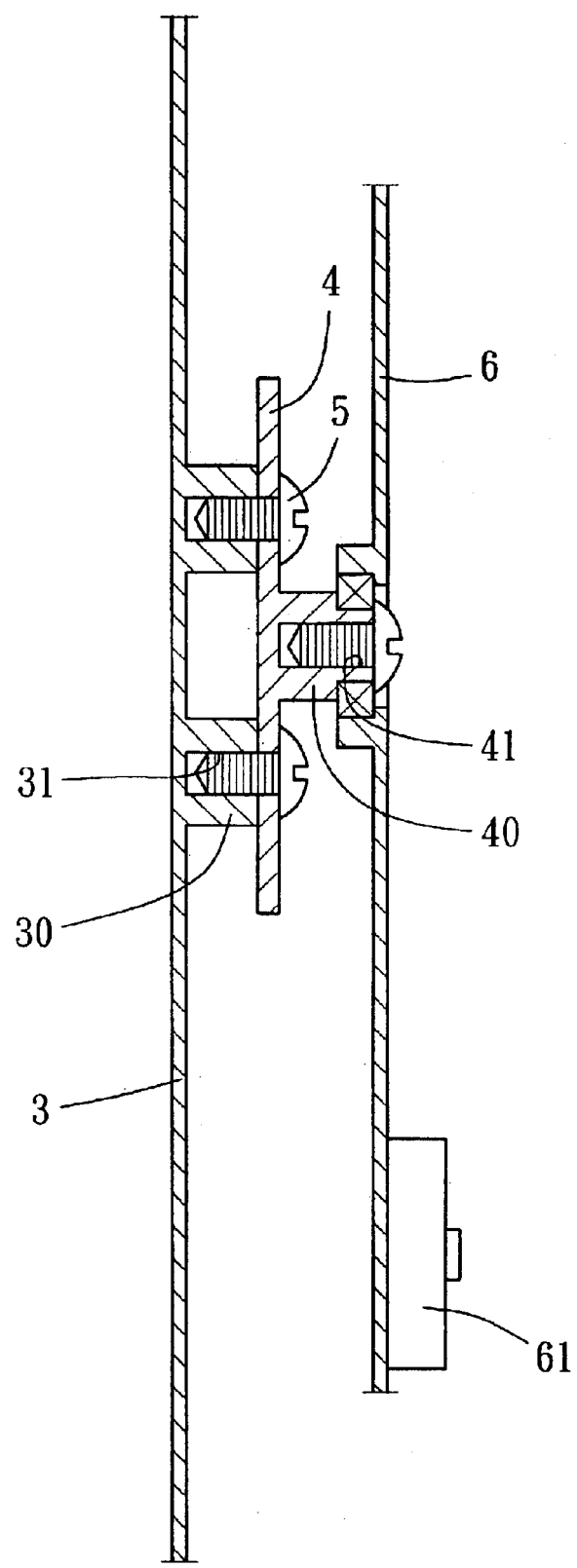
FIG. 3 is a cross-sectional view of the first embodiment of the double-deck wheel rim cover for an automobile in the present invention, indicating the inner decorative member combined with the wheel rim cover.

The round combining plate 4 is fixedly positioned on the support studs 30 by bolts 5 respectively engaging with the combining holes 31 of the support studs 30, as shown in FIG. 3. The round combining plate 4 is provided with a hollow combining shaft 40 extending outward vertically in the center of the inner side and having a combining hole 41.

Figure 4:
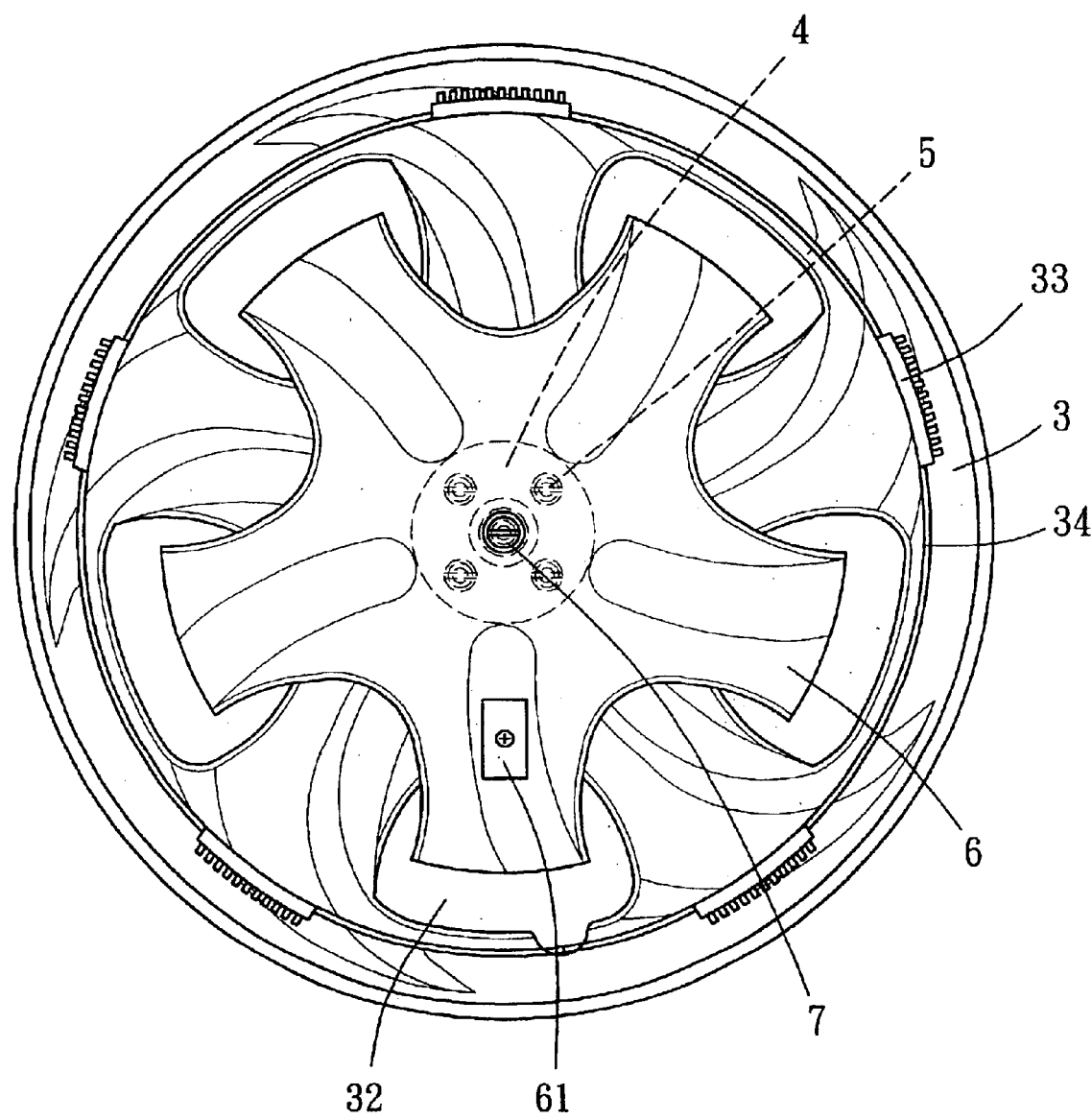
FIG. 4 is a rear view of the first embodiment of the double-deck wheel rim cover in an assembled condition in the present invention.

The inner decorative member 6 is provided with a bearing 60 in the cent er for the combining shaft 40 of the round combining plate 4 to be fitted and positioned therein by a bolt 7 engaging with the combining hole 41 of the round combining plate 4, as shown in FIG. 4.

Figure 5:
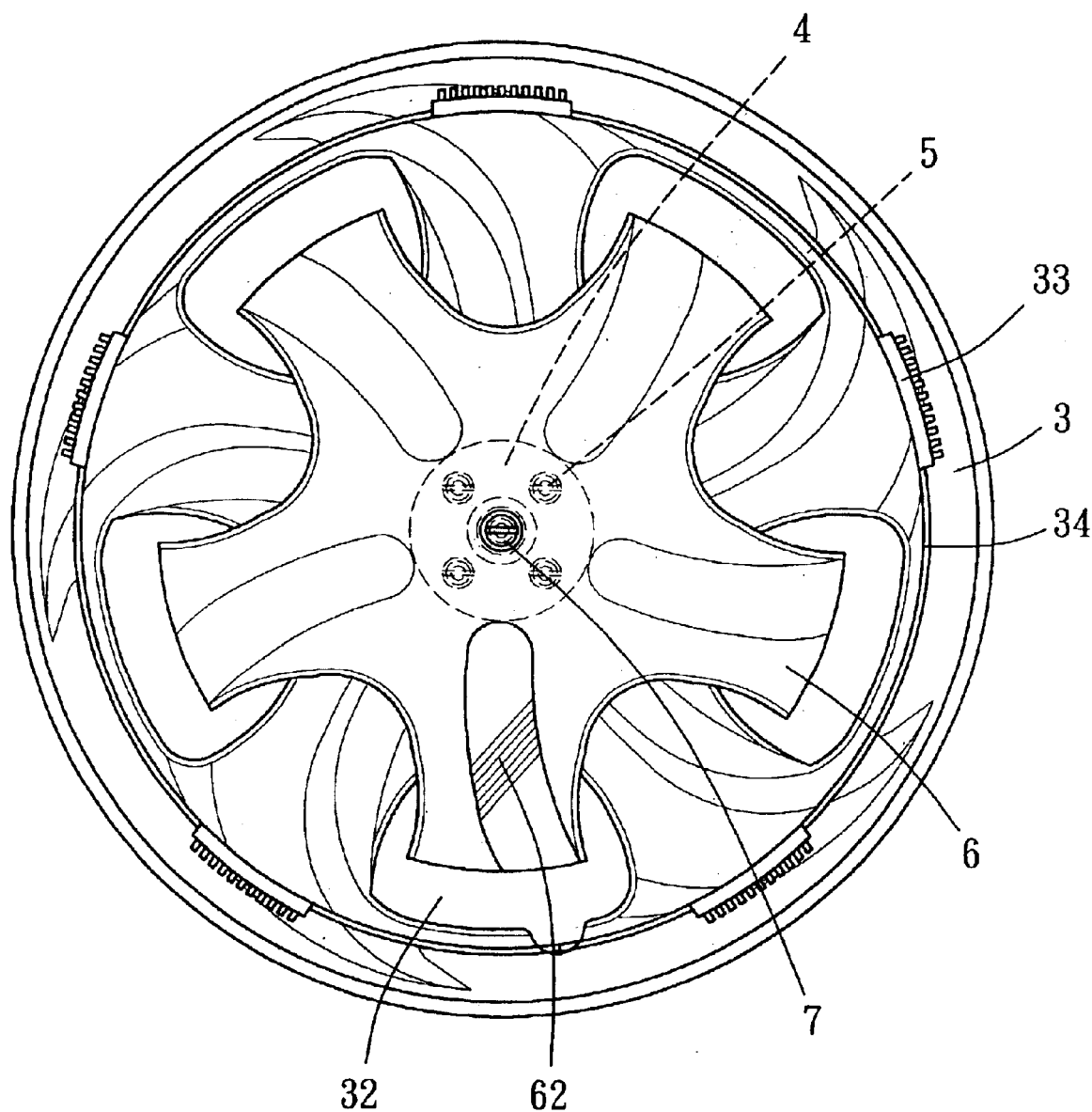
FIG. 5 is a rear view of a second embodiment of the double-deck wheel rim in an assembled condition in the present invention.

In addition, the wheel rim cover body 3 is equidistantly bored with a plurality of windows 32, so that the motion of the inner decorative member 6 can be seen from outside through these windows 32. The inner decorative member 6 in the first preferred embodiment is additionally provided thereon with a weight-balancing block 61, as shown in FIG. 2, while the inner decorative member 6 in a second preferred embodiment is formed integral with a weight-balancing member 62 at a preset location, as shown in FIG. 5. Practically, either of these two preferred embodiments is available for weight balancing.

In assembling, the combining plate 4 is directly fixed on the support studs 30 of the wheel rim cover body 3 by means of the bolts 5 respectively engaging with the combining holes 31 of the support studs 30. Then, the inner decoration member 6 has its central bearing 60 directly fitted around the combining shaft 40 of the combining plate 4 and positioned thereon by the bolt 7 engaging with the combining hole 41 of the combining shaft 40 of the combining plate 4, able to finish assembling the double-deck rim cover with quickness.

After installed on the wheel rim of an automobile, the double-deck wheel rim cover has functions of displaying both static and dynamic decoration. When an automobile runs, the wheel rim cover body 3 will be actuated to rotate together with the wheel rim, but the inner decorative member 6 does not synchronously rotate with them because it is not fixed with the wheel rim cover body 3 but axially assembled with the combining plate 4 of the wheel rim cover body 3. Although the inner decorative member 6 may be actuated to rotate by the whirling current of air produced by rotation of the wheel rim cover body 3, yet it will not synchronously rotate at high speed together with the wheel rim cover body 3, because the inner decorative member 6 is provided with the weight-balancing member which always makes the center of gravity of the inner decorative member 6 move downward.

Thus, when an automobile runs, there will produce a visual effect of different rotating speeds of both the wheel rim cover body 3 and the inner decorative member 6, and this visual effect can be seen through the windows 32 of the wheel rim cover body 3, thus obtaining a function of dynamic decoration of the wheel rim of an automobile.

Further, the wheel rim cover body 3 and the inner decorative member 6 in the present invention can be designed into various shapes in appearance and had better be designed into different colors between them so as to achieve a manifest visual effect of displaying dynamic and static decoration of the wheel rims of an automobile.

While the preferred embodiments of the invention have been described above, it will be recognized and understood that various modifications may be made therein and the appended claims are intended to cover all such modifications that may fall within the spirit and scope of the invention.

I claim:

1. A double-deck wheel rim cover comprising:
  a wheel rim cover body formed integral with a plurality of support studs at a center portion of the wheel rim cover body, said support studs each protruding outwards to face a wheel rim of an automobile and having a combining hole,
  a round combining plate fixed on said support studs and provided in a center thereof with a hollow combining shaft, said hollow combining shaft extending outwards along the rotative axis of the double-deck wheel rim cover and having a combining hole at an outer end,
  an inner decorative member provided with a bearing rotatively secured to the outer end of said combining shaft,
  said inner decorative member assembled axially with said combining plate by a bolt engaging with said combining hole of said combining plate,
  said wheel rim cover body further comprising a plurality of open windows, wherein rotation of said inner decorative member is visible through said windows, and
  said inner decorative member is further provided with a weight-balancing member.

2. The double-deck wheel rim cover for an automobile as claimed in claim 1 wherein the weight-balancing member is a separate weight-balancing block additionally disposed on said inner decorative member.

3. The double-deck wheel rim cover for an automobile as claimed in claim 1, wherein said weight-balancing member is formed integrally with said inner decorative member decorative member.

4. The double-deck wheel rim cover as claimed in claim 1, wherein color of said wheel rim cover body is different from that of said inner decorative member.

\* \* \* \* \*